Jan. 12, 1960     E. M. KANE     2,920,479
SQUIB TESTER

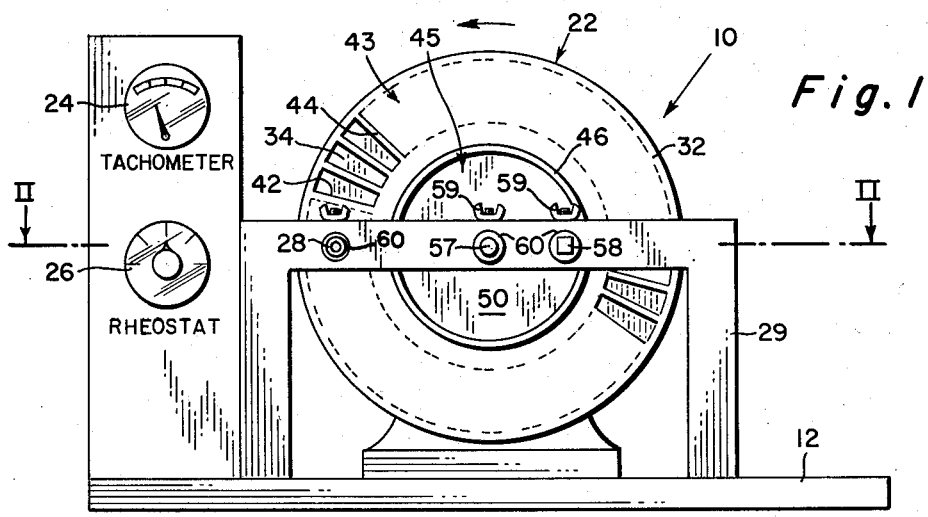

Filed Oct. 28, 1958     2 Sheets-Sheet 2

INVENTOR.
ERNEST M. KANE
BY
ATTORNEYS

United States Patent Office 2,920,479
Patented Jan. 12, 1960

2,920,479
SQUIB TESTER

Ernest M. Kane, Oxnard, Calif., assignor to the United States of America as represented by the Secretary of the Navy Application October 28, 1958, Serial No. 770,238

6 Claims. (Cl. 73—35)

(Granted under Title 35, U.S. Code (1952), sec. 266)

The invention described herein may be manufactured and used by or for the government of the United States of America for governmental purposes without the payment of any royalties thereon or therefor.

The present invention relates in general to test devices, and more particularly to a device for testing the burning characteristics of explosive elements, such as squibs, ignitors, and the like.

Numerous types of pyrotechnic devices require the use of an igniting charge such as a squib, to initiate the burning of a powder train. In the test and evaluation of such squibs it is necessary to determine, among other characteristics, the extent of the ignition delay; the duration of squib burning; and the blast characteristics during burning.

Heretofore, the principal method for evaluating squib ignition and burning has been by means of high speed movie photography. It is apparent that such a method is expensive, cumbersome for record purposes, and does not provide an accurate measurement of the duration of burning because the presence of smoke obscures the flame.

The invention device overcomes the aforementioned disadvantages by providing a movable timing support driven at a predetermined speed and having a flame-sensitive recording means mounted thereto and adapted to be positioned in the path of the squib exhaust. Means are provided for confining the blast to a limited area of the recording means. In a preferred embodiment, the flame recording means is a sheet of paper, plastic or the like detachably secured to a wheel-type support. The confining means is a recessed member positioned adjacent the recording means, and between the latter and the squib. For the testing of electrical squibs, the timing wheel is provided with a commutator bar connected in a circuit whereby the squib may be ignited at a preset position of the timing wheel.

A principal object of this invention is to provide a device for measuring accurately the burning characteristics of explosive elements and produce a permanent record.

Another object is to provide such a device that can measure ignition delay, duration of burning, and blast characteristics.

Other objects and many of the attendant advantages of this invention will be readily appreciated as the same becomes better understood by reference to the following detailed description when considered in connection with the accompanying drawings wherein:

Fig. 1 is a front elevation of the test device of this invention;

Fig. 2 is a partially exploded cross section taken along line II—II of Fig. 1, with the electrical components connected in a control circuit;

Figure 3:
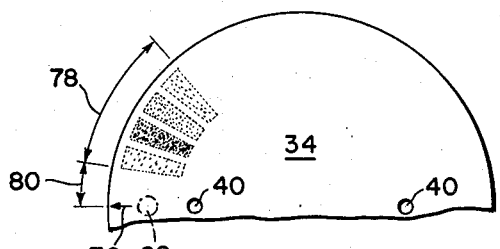
Fig. 3 is a partial sample of a recording means having indicia burned on the face thereof as a result of a test firing.

Referring to the drawings where the same reference numerals refer to like parts throughout the drawings, there is shown in Figs. 1 and 2 a squib test device 10 comprising a base 12 on which is mounted a motor 14 having a shaft 16 locked by a set screw 18 to hub 20 of a timing support, such as a wheel 22. Motor 14 is a variable-speed electric motor provided with a tachometer 24 for indicating motor speed, and a rheostat 26 for regulating the desired speed of the timing wheel depending on the extent of burning time of a squib 28 being tested. Squib 28 is supported in close proximity to the face of timing wheel 22 by a frame 29.

In the embodiment of Figs. 1–3, timing wheel 22 comprises separable disk members 30 and 32 between which is adapted to be clamped or otherwise supported a flame-sensitive recording means 34. Disk member 30 is integral with hub 20 for supporting the wheel to motor shaft 16, and disk member 32 is removably supported to disk member 30 by any suitable securing means, such as a pair of studs 36 and aligned apertures 38 in the respective disk members. Flame sensitive recording means 34 is preferably constructed of a sheet of material capable of being visibly seared, or otherwise sensitive to the squib flame, such as paper, plastic, or the like, an example being illustrated in Fig. 3. Recording means 34 is provided with a pair of apertures 40 to receive studs 36 and lock the recording means to disk member 30 while permitting ready replacement for the next test. The recording means thus provides an inexpensive and permanent record that can be readily filed for future reference.

The squib flame is transmitted to the flame-sensitive recording means via a plurality of radially disposed recesses or slots 42 extending transversely through disk members 32 being confined to ring-shaped portion 43 thereof, the slots being separated by spacers 44. Each slot is substantially the same width as squib 28 and of a length sufficient to record the diameter of the flame pattern or a substantial portion thereof.

For the testing of ¼ inch diameter electrical squibs used in missile tracking flares, a test device has been satisfactorily used in which the timing wheel disk member 32 is provided with seventy-two spacers 44, with the slots being ¾ inch in length.

Ring-shaped, slotted portion 43 of the disk member 32 is separated from the central portion 45 of the member by a sleeve 46 having one end formed integral therewith. An insulator plate 50 is mounted by screws 52 to the central portion 45 within sleeve 46. A commutator bar 54 is embedded within insulator plate to extend radially from an enlarged circular central portion 56. The bar rotates with the timing wheel and functions in series with a manual switch or button to trigger the squib firing circuit (Fig. 2). Sleeve 46 extends with its longitudinal axis normally to the disk sufficiently from the face of disk member 32 to protect commutator bar 54 from the squib flame.

Adapted to be engaged by commutator bar 54 are two electrical contacts 57 and 58 mounted in a horizontal portion of frame 29 laterally adjacent squib 28, the contacts and the squib projecting normal to timing wheel 22. The squib and contacts are provided with insulator sleeves 60 housed in drilled openings in frame 29 and detachably secured therein by screws 59. Contact 57 is round in cross-section to contact the corresponding round portion 56 of the commutator bar, and being at the center of timing wheel 22 this electrical contact is continuous throughout the wheel rotation. Contact 58 may be square in cross section to obtain maximum contact area with a corresponding portion of the commutator bar which it sweeps across intermittently during timing wheel rotation.

Squib 28 is mounted on frame 29 axially aligned with the mean radius of the ring-shaped slotted portion 43 of the wheel so as to produce a sufficient flame pattern on the recording means that will give a suitable indication of the flame size.

Referring to the squib control circuit shown in Fig. 2, a firing circuit includes electrical leads 62 from squib 28 connected across a suitable electrical power source (a common range being 6 to 24 volts D.C.) through normally open contacts 64 of a holding relay 66. A holding circuit including the coil of relay 66 is also connected across the power source being in series with leads 68 connected to contacts 57 and 58 and a starting push-button switch 70.

The holding circuit is momentarily energized when commutator bar 54 bridges contacts 57 and 58 to energize relay coil 66 and close relay contacts 64. The closing of relay 66 completes the firing circuit and causes the ignition of the test squib. The firing circuit is maintained in energized condition through closed relay even though the holding circuit is deenergized by commutator bar 54 riding off contact 58 by rotation of the timing wheel.

Figure 4:
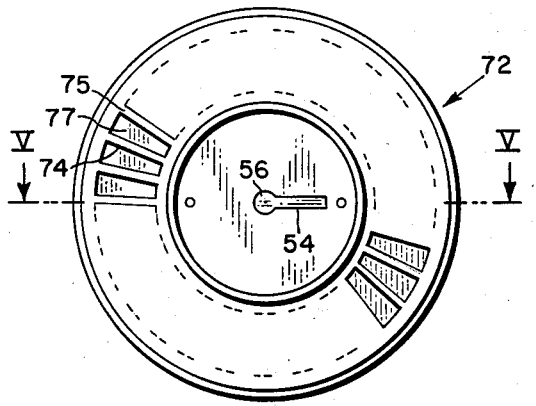
Fig. 4 is a front elevation of a modified timing support and recording means.
Figure 5:
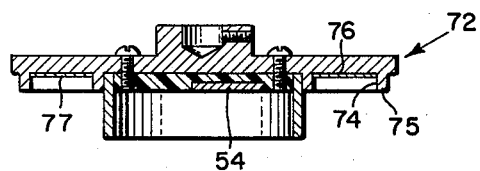
Fig. 5 is a cross section taken along line V—V of Fig. 4.

In the modification of Figs. 1–3, timing wheel 22 comprises two halves with the replaceable recording means 34 clamped therebetween. In the modification of Figs. 4 and 5, a timing wheel 72 is a one-piece construction having formed on the outer face a plurality of recesses 74 and spacers 75 corresponding in configuration and number with slots 42 and spaces 44 on timing wheel 22. However, recesses 74 do not extend transversely through the wheel having a bottom portion 76 which is painted with a flame-sensitive paint, lacquer, or other coating 77 that will discolor or otherwise be affected by the flame. After a test has been completed and the data obtained by observing the flame marks on the coating, recesses 74 are painted with a fresh coating in readiness for the next test. A disadvantage of this modification is that the timing wheel 72 and recording means 77 are integral, not being separable for record keeping.

An operation cycle is described with reference to the modification of Figs. 1–3. A clean sheet of flame-recording means, for example, a disk of white paper 34 is clamped between disk members 30 and 32 of timing wheel 22. A squib to be tested is mounted on frame 29 and electrically connected in the control circuit with push-button switch 70 being in an open position. A zero reference mark 79 (Fig. 3) is scribed on paper disk 34 diametrically opposite commutator bar 54, which reference mark designates the start of squib ignition. Motor 14 is energized and when the timing wheel has acquired the predetermined speed by observance of tachometer 24, through adjustment of rheostat 26, firing button 70 is manually closed so that when the commutator bar 54 next bridges contacts 57 and 58 relay 66 is closed by the flow of current, energizing the firing circuit and igniting the squib. Holding relay remains closed to provide a constant flow of current to the squib to ensure initiation of burning. As the squib burns during timing wheel rotation, the flames are directed through successive slots 42 and against recording disk 34. The angular distance 80 from zero reference mark to the first legible flame mark is a measure of the delay time when correlated with the speed of timing wheel rotation. The increase and decrease in the flame at the beginning and end, respectively, and the intermediate normal burning span is readily visible by observing the shape and the intensity of the flame marks on the paper disk 34. A measure of the total burning time is the angular distance 78 from the first and last flame mark.

This invention provides a simple, accurate, and expedient device for testing of squibs. The flame recording means of the modification of Figs. 1–3 permits the recording of each test in a convenient and inexpensive form for filing.

Obviously many modifications and variations of the present invention are possible in the light of the above teachings. It is therefore to be understood that within the scope of the appended claims the invention may be practiced otherwise than as specifically described.

I claim:
1. A device for testing the burning characteristics of a squib comprising a timing wheel having a surface provided with a plurality of spaced recesses in which are adapted to be located flame-sensitive recording means, means for driving said wheel at a selected speed, means for supporting the squib in close proximity to said surface so that the recessed recording means is in the path of the explosive blast, means for igniting the squib at a predetermined position of said wheel whereby the flame of the burning squib will react on successive portions of said recording means in timed sequence.

2. The device of claim 1 wherein said spaced recesses of the timing wheel are grooves formed on one surface thereof, and said flame-sensitive recording means is a coating applied to the base of said grooves.

3. The device of claim 1 wherein said timing wheel comprises two disk portions, one of said disk portions being a base connected to the drive means, the other disk means being provided with a plurality of spaced radial slots extending therethrough, and said flame-sensitive recording means being sheet material adapted to be clamped between said disk members, and means for securing said disk members in clamped relation.

4. The device of claim 1 wherein said ignition means comprises an electrical circuit including a commutator bar mounted on said wheel, a pair of contacts adapted to be bridged by said bar at a predetermined position of said wheel, and a power source connected to said contacts through said squib for igniting the squib at a predetermined portion of said wheel.

5. A device for testing the burning characteristics of a squib comprising a timing wheel formed of two separable disks, one disk being a base member, and the other disk being a radially slotted cover member, means for driving said base disk member at a selected speed, means for varying the speed of the driving means, a replaceable flame-sensitive recording means adapted to be positioned between said disk members, means for detachably securing the cover member to the base member with the recording means clamped therebetween, means for supporting an electrically operated squib in close proximity to said cover member so that the explosive blast passes through the slotted cover to contact the recording means, an ignition circuit for igniting the squib at a predetermined position of said wheel whereby the flame of the burning squib will react on successive portions of said recording means in timed sequence.

6. A firing circuit for testing an electrical squib comprising a power source connected across the leads of said squib through the normally open contacts of an interlock switch operable by a coil, said interlock coil being energized by a holding circuit pair of contacts adapted to be bridged by a commutator bar mounted on a timing support and a firing switch, whereby closing of the firing switch will energize said coil to close the interlock switch and fire the squib when said commutator bridges the contacts in the holding circuit.

References Cited in the file of this patent

UNITED STATES PATENTS

| 1,044,835 | Wattles | Nov. 19, 1912 |
| 1,922,320 | Olin et al. | Aug. 15, 1933 |
| 1,967,895 | Marvin | July 24, 1934 |
| 2,431,683 | Biggar | Dec. 2, 1947 |
| 2,532,620 | Higgs | Dec. 5, 1950 |
| 2,614,430 | Ballard et al. | Oct. 21, 1952 |